United States Patent
Tseng

(10) Patent No.: US 8,598,903 B1
(45) Date of Patent: Dec. 3, 2013

(54) TESTING METHOD AND TESTING DEVICE FOR PHOTOELECTRIC CONVERSION DIE

(75) Inventor: Kuo-Fong Tseng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/592,357

(22) Filed: Aug. 23, 2012

(30) Foreign Application Priority Data

May 10, 2012 (TW) ................................ 10116597 A

(51) Int. Cl.
*G01R 31/305* (2006.01)
*G01R 31/26* (2006.01)

(52) U.S. Cl.
USPC ............. 324/754.22; 324/761.01; 324/762.07

(58) Field of Classification Search
USPC .................. 324/501, 759.03, 762.01–762.03, 324/762.05–762.07; 356/218, 434
See application file for complete search history.

(56) References Cited

U.S. PATENT DOCUMENTS

| | | | |
|---|---|---|---|
| 6,369,590 B1* | 4/2002 | Cugini et al. | 324/754.23 |
| 2003/0147060 A1* | 8/2003 | Tokuda et al. | 355/53 |
| 2004/0059444 A1* | 3/2004 | Tsukakoshi | 700/59 |
| 2005/0045821 A1* | 3/2005 | Noji et al. | 250/311 |
| 2008/0221709 A1* | 9/2008 | Ishii et al. | 700/30 |
| 2008/0273193 A1* | 11/2008 | Nishiyama et al. | 356/73 |
| 2008/0315078 A1* | 12/2008 | Ono | 250/238 |

* cited by examiner

*Primary Examiner* — Minh N Tang
(74) *Attorney, Agent, or Firm* — Altis & Wispro Law Group, Inc.

(57) ABSTRACT

A testing device includes a laser source, a current testing device, and a processor. The processor includes a user interface, a control unit, a calculation unit, and a data generation unit. The user interface receives user inputs to determine control parameters. The control unit controls the laser source to emit a laser beam on a photoelectric conversion die according to the control parameters. The laser beam has an optical output power value P. The control unit also controls the current testing device to measure a current value I output by the photoelectric conversion die after the laser beam irradiating on the photoelectric conversion die. The calculation unit calculates a photoelectric conversion efficiency F according to the formula: F=P/I. The data generation unit processes the photoelectric conversion efficiency F which indicates the electro-optical property of the photoelectric conversion die.

13 Claims, 3 Drawing Sheets

TESTING METHOD AND TESTING DEVICE FOR PHOTOELECTRIC CONVERSION DIE

BACKGROUND

1. Technical Field

The present disclosure relates to photoelectric conversion elements and, particularly, to a testing method and a testing device for a photoelectric conversion die.

2. Description of Related Art

Photoelectric conversion elements include a photoelectric conversion die and a package packaging the photoelectric conversion die. An electro-optical conversion property of the photoelectric conversion element, which determines if the photoelectric conversion element is qualified, mainly depends on an electro-optical conversion property of the photoelectric conversion die. However, a quality of the photoelectric conversion element is only tested after being packaged. As such, an unsatisfactory unqualified photoelectric conversion die will not be discovered until after the electronic product is packaged, which wastes time and materials.

Therefore, it is desirable to provide a testing method and testing device for a photoelectric conversion die which can overcome the above-mentioned shortcomings.

DETAILED DESCRIPTION

Embodiments of the disclosure will be described with reference to the accompanying drawings.

Figure 1:
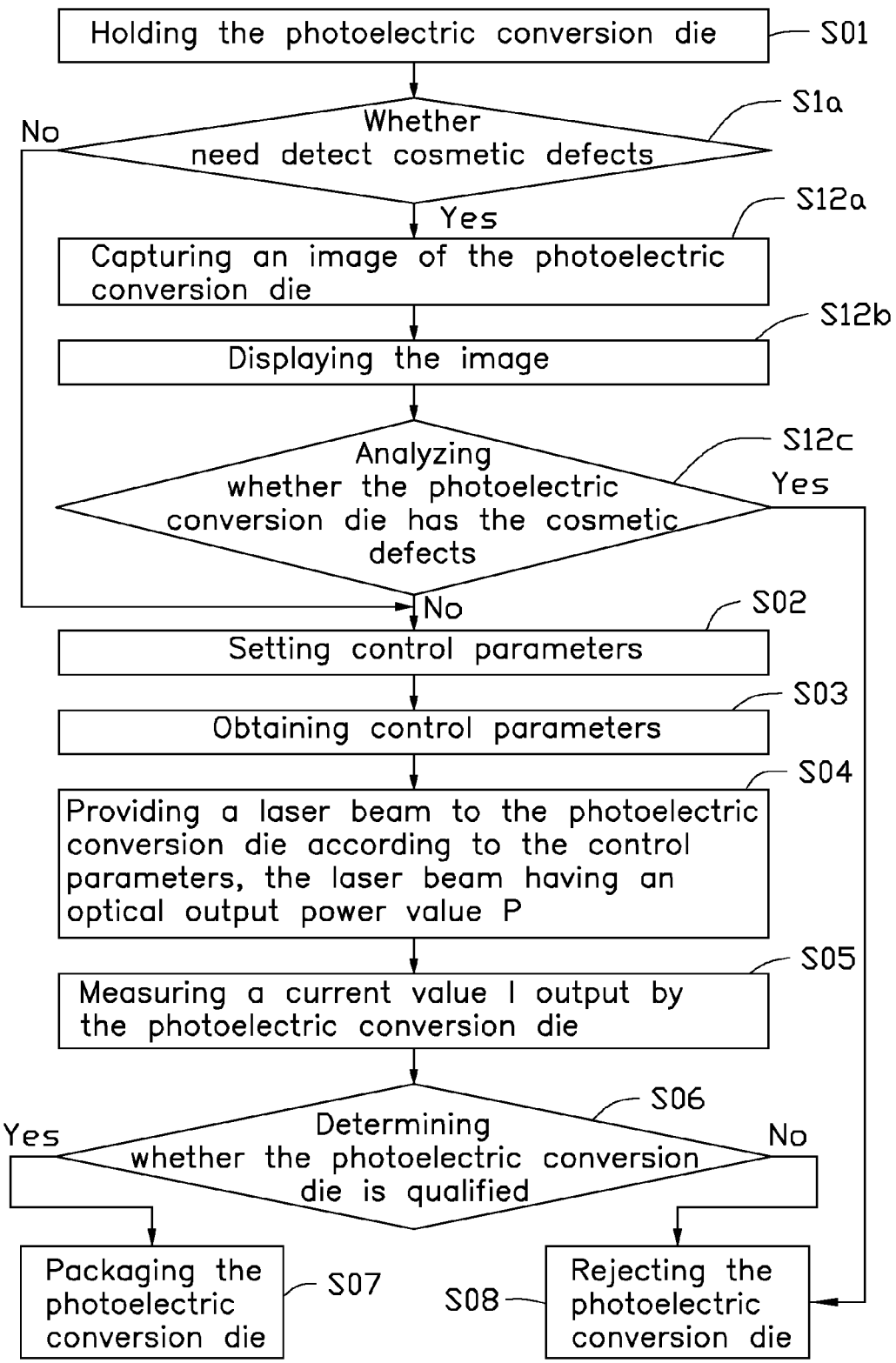
FIG. 1 is a flow chart of a testing method for a photoelectric conversion die according to an embodiment.

FIG. 1 shows a testing method, according to one embodiment. The testing method tests if a photoelectric conversion die 20 (see FIG. 2) is qualified with a predetermined electro-optical property. If qualified, the photoelectric conversion die 20 is packaged into photoelectric conversion element. The testing method includes the following steps S01-S08.

In step S01 holding the photoelectric conversion die 20.

In step S1a, determining whether any cosmetic defects of the photoelectric conversion die 20 can be detected. If it is determined that there are no significant cosmetic defects of the photoelectric conversion die 20, the testing method goes to step S02.

In step S02, setting control parameters.

In step S03, obtaining control parameters.

In step S04, providing a laser beam to the photoelectric conversion die 20 according to the control parameters, and the laser beam having an optical output power value P.

In the step S05, measuring a current value I output by the photoelectric conversion die 20.

In the step S06, determining whether the photoelectric conversion die 20 in fact possesses the predetermined electro-optical property based upon the ratio of the current value output by the photoelectric conversion die 20 and the optical output power value P. If the photoelectric conversion die 20 is qualified, the testing method goes to step S07, otherwise, the testing method goes to step S08.

In the step S07, packaging the photoelectric conversion die 20.

In the step S08, rejecting photoelectric conversion die 20.

Figure 2:
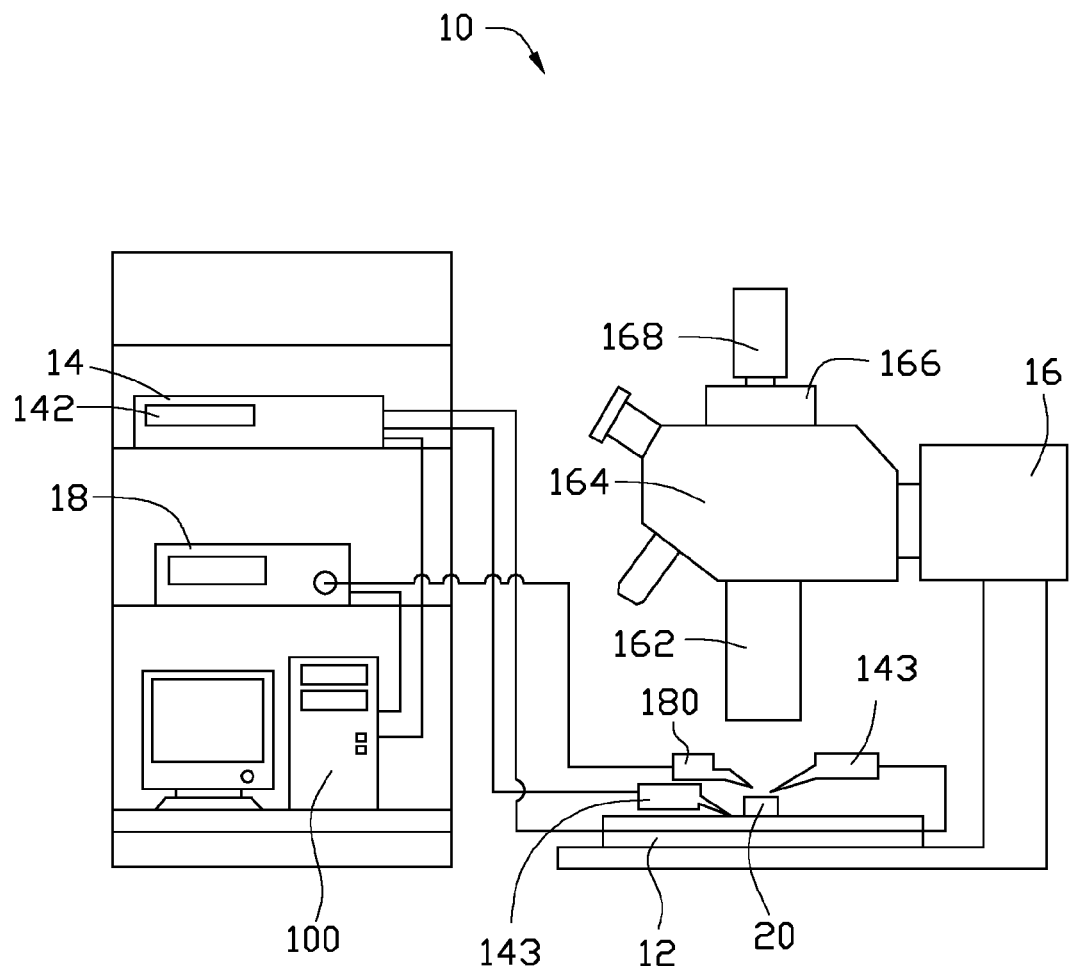
FIG. 2 is a schematic view of a testing device for the photoelectric conversion die according to another embodiment.
Figure 3:
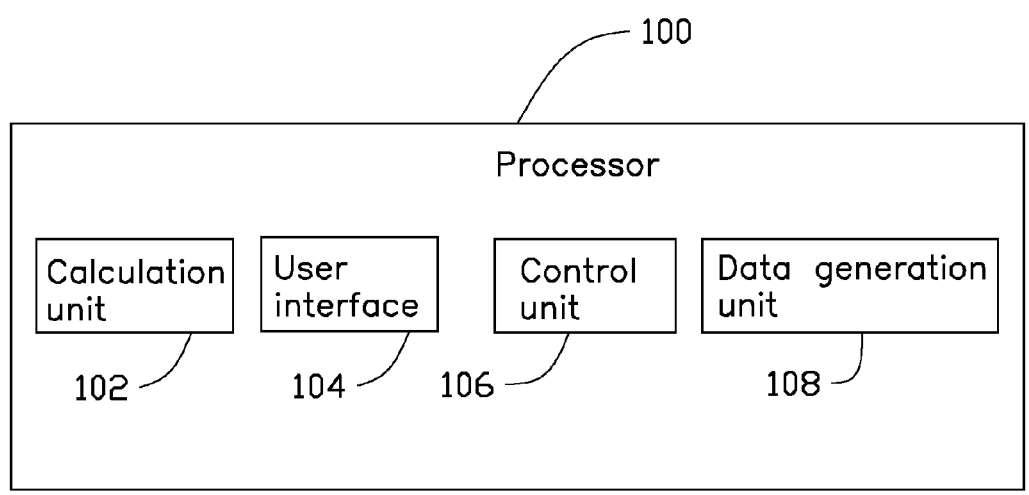
FIG. 3 is a schematic view of a processor of the testing device of FIG. 2.

FIG. 2 shows a testing device 10 for implementing the testing method of FIG. 1, according to another embodiment. The testing device 10 includes a chuck 12, a current testing device 14, a support 16, a laser source 18, and a processor 100.

The photoelectric conversion die 20 is held by the chuck 12. That is, the step S01 can be carried out with the chuck 12. However, in other embodiments, the photoelectric conversion die 20 can be held by other devices/methods.

The current testing device 14 includes a current meter 142 and two probes 143. A probe 143 is electrically connected to the anode electrode and the other probe 143 is electrically connected to the cathode electrode of the photoelectric conversion die 20. The two probes 143 are configured to measure current values output by the photoelectric conversion die 20 and input the current values to the current meter 142. The current meter 142 displays the current values. In the embodiment, the current meter 142 is integrated in the current testing device 14.

The support 16 is positioned on the chuck 12 and includes a first cantilever 162 above the chuck 12.

The laser source 18 emits a laser beam. One end of a fiber 180 is connected to the laser source 18, and the other end of the fiber 180 is positioned above the photoelectric conversion die 20. Laser beam emitted by the laser source 18 is directed onto the photoelectric conversion die 20 through the fiber 180.

The processor 100 is electrically connected to the current testing device 14 and the laser source 18. The processor 100 includes a calculation unit 102, a user interface 104, a control unit 106, and a data generation unit 108.

The user interface 104 receives user inputs and thus determines the control parameters of the laser source 18 corresponding to the user inputs. That is, the step S02, can be carried out by the user interface 104.

The control unit 106 receives the control parameters and controls the laser source 18 to emit a laser beam according to the control parameters, the laser beam corresponding to an optical output power value P. That is, the laser source 18 and the control unit 106 cooperatively implement the step S03. The control unit 106 also controls the two probes 143 measuring a current value I output by the photoelectric conversion die 20 during irradiation of the photoelectric conversion die 20 by the laser beam, and the current meter 142 displays the current value I. That is, the two probes 143, the current meter 142, and the control unit 106 cooperatively implement the step S04.

The calculation unit 102 calculates photoelectric conversion efficiency F according to the formulae: $F=P/I$. That is, the step S05 can be carried out by the calculation unit 102.

The data generation unit 108 processes photoelectric conversion efficiency F which indicates the electro-optical property of the photoelectric conversion die 20. That is, the calculation unit 102 and the user interface 104 cooperatively implement the step S06. If photoelectric conversion efficiency F of the photoelectric conversion die 20 is within an acceptable range, the photoelectric conversion die 20 is deemed qualified and satisfactory. Otherwise, the photoelectric conversion die 20 is rejected and is not packaged.

The disclosure reveals an unqualified photoelectric conversion die 20, and so avoids wasted packaging, which saves time and materials. In addition, the testing can be implemented efficiently and under uniform criteria by the testing method and testing device.

The support 16 can further include a rotary plate 164, a second cantilever 166, and a camera module 168. The first cantilever 162 extends from the rotary plate 164. The second cantilever 166 also extends from the rotary plate 164. The camera module 168 is positioned on the second cantilever 166 and can be positioned to directly face the photoelectric conversion die 20 by rotating the rotary plate 164. The testing method further includes steps S12*a*, S12*b*, and S12*c*.

In step S12*a*, capturing an image of the photoelectric conversion die 20 with the camera module 168. To determine the existence of any significant cosmetic defects of the photoelectric conversion die 20, the camera module 168 is positioned to directly face the photoelectric conversion die 20 by rotating the rotary plate 164 and is actuated to capture an image of the photoelectric conversion die 20.

In step S12*b*, displaying the image of the photoelectric conversion die 20.

In step S12*c*, analyzing the image of the photoelectric conversion die 20 for any significant cosmetic defects. If the photoelectric conversion die 20 has no cosmetic defects, the testing method goes to step S2. Otherwise, the photoelectric conversion die 20 is rejected and no packaging takes place.

Particular embodiments are shown here and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A testing device for testing a photoelectric conversion die, the testing device comprising:
   a laser source configured to emit a laser beam irradiating on the photoelectric conversion die;
   a current testing device configured to measure current values output by the photoelectric conversion die; and
   a processor in communication with the current testing device and the laser source, the processor comprising:
   a user interface configured for receiving user inputs, thus to determine control parameters of the laser source corresponding to the user inputs;
   a control unit configured for receiving the control parameters and controlling the laser source to emit the laser beam according to the control parameters, the laser beam having an optical output power value P, the control unit also controlling the current testing device to measure a current value I output by the photoelectric conversion die after the laser beam irradiating on the photoelectric conversion die;
   a calculation unit configured for calculating a photoelectric conversion efficiency F according to the formula: F=P/I; and
   a data generation unit configured for processing the photoelectric conversion efficiency F which indicates the electro-optical property of the photoelectric conversion die.

2. The testing device of claim 1, wherein the current testing device comprises a current meter to display the current values.

3. The testing device of claim 2, wherein the current testing device further comprises two probes for measuring the current values output by the photoelectric conversion die and inputting the current values to the current meter.

4. The testing device of claim 1, further comprising a chuck to hold the photoelectric conversion die.

5. The testing device of claim 4, further comprising a support and a first cantilever, wherein the support is positioned on the chuck, the first cantilever extends from the support and is positioned above the chuck.

6. The testing device of claim 5, wherein the support comprises a rotary plate, a second cantilever and a camera module, the first cantilever extends from the rotary plate, the second cantilever extends from the rotary plate, the camera module is positioned on the second cantilever and can be positioned to directly face the photoelectric conversion die by rotating the rotary plate.

7. The testing device of claim 1, further comprising a fiber, wherein one end of the fiber is connected to the laser source, and the other end of the fiber is positioned above the photoelectric conversion die, the laser beam emitted by the laser source is directed onto the photoelectric conversion die through the fiber.

8. The testing device of claim 1, wherein if the photoelectric conversion efficiency F of the photoelectric conversion die is within an acceptable range, the photoelectric conversion die is deemed qualified and satisfactory.

9. A testing method for testing a photoelectric conversion die, the testing method comprising:
   obtaining control parameters;
   providing a laser beam to the photoelectric conversion die according to the control parameters, the laser beam having an optical output power value P;
   measuring a current value I output by the photoelectric conversion die; and
   determining whether the photoelectric conversion die is qualified based upon the ratio of the current value output I and the optical output power value P.

10. The testing method of claim 9, further comprising:
    capturing an image of the photoelectric conversion die;
    displaying the image; and
    analyzing the image of the photoelectric conversion die for any significant cosmetic defects.

11. The testing method of claim 9, further comprising: packaging the photoelectric conversion die, if the photoelectric conversion die is qualified.

12. The testing method of claim 9, further comprising: rejecting the photoelectric conversion die, if the photoelectric conversion die is not qualified.

13. The testing method of claim 9, wherein if the ratio of the current value output I and the optical output power value P is within an acceptable range, the photoelectric conversion die is deemed qualified and satisfactory, otherwise, the photoelectric conversion die is rejected and is not packaged.

* * * * *